Dec. 29, 1942.　　　P. TALMEY　　　2,306,509

GAS DETECTOR

Filed Oct. 2, 1939

INVENTOR
Paul Talmey
BY
Alfred W. Barber
ATTORNEY

Patented Dec. 29, 1942

2,306,509

UNITED STATES PATENT OFFICE 2,306,509

GAS DETECTOR

Paul Talmey, New York, N. Y.

Application October 2, 1939, Serial No. 297,547

3 Claims. (Cl. 23—255)

The present invention concerns gas detectors and in particular gas detectors which operate an alarm, indicator or control device in the presence of minute quantities of undesired gas in an atmosphere.

One object of the present invention is to provide a gas detector which is simple in construction yet sturdy, stable, sensitive and rapid in operation.

Another object is to operate, by direct mechanical action, a device such as an indicator or electrical switch.

Still another object is to provide an automatic alarm in case of failure of any part of the detector circuit.

A further object is to provide an automatic alarm in case of failure of the atmosphere supply.

A still further object is to provide an automatic alarm in case of electrical current failure in the source of supply to the detector.

These and still other objects will be apparent from the detailed description of the various figures of the drawing.

Gas detectors in the past have, in general, been of two types. One type utilized a Wheatstone bridge resistance thermometer to detect either the different thermal capacity of the gas to be detected or a rise in temperature of a catalyst due to the combustion of the gas thereon. The other type consisted of a bi-metallic element heated by the action of the gas on a catalyst. The difficulty involved in the Wheatstone bridge type is that the currents available in the indicating arm are so small that relatively delicate and expensive indicators or relays are essential. The bi-metallic method, due to the large section of the element itself, is quite sluggish and the bi-metallic materials generally used are not sufficiently stable within the optimum temperature range. Attempts to improve the sensitivity and stability of these types result in complicated and expensive structures. The forces available for closing or opening of contacts are relatively small, particularly in the Wheatstone bridge type.

The present invention utilizes the stretch in a tensioned and preheated wire due to additional heating caused by combustion of the gas to be detected upon contact with a catalyst covering the wire. The device is simple and sturdy while its sensitivity and stability are very high. Atmosphere containing the gas to be detected is passed over the catalyst covered wire. In the absence of gas the air cools the electrically preheated wire causing it to contract and open the alarm circuit. When gas is present in the air it undergoes incomplete combustion upon contact with the catalyst, raising the temperature of the wire causing it to expand and close the alarm or indicator circuit. Failure of the air-gas supply removes the cooling effect of the air causing the wire to stretch and close the alarm or indicator circuit. Breakage of the wire also closes the alarm or indicator circuit. An auxiliary alarm circuit operates if the wire heating and alarm electrical current supply fails.

Figure 1:
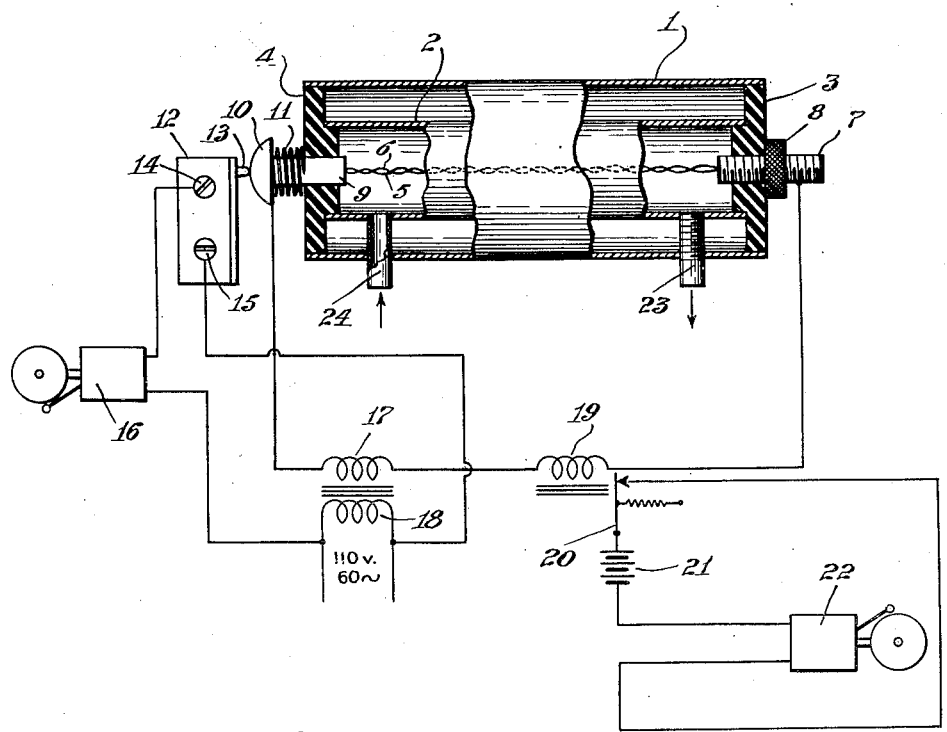
Fig. 1 shows one form of the present invention in connection with a switch operated alarm.

Fig. 1 shows an outer cylinder 1 enclosing an inner cylinder 2. Fitted into the ends of cylinder 1 are end plugs 3 and 4, at least one of which is made of insulating material, which serve to position inner cylinder 2 and to hold the wire supports 7 and 9. Wires 5 and 6 coated with a catalyst are twisted and stretched between supports 7 and 9. Support 7 is threaded and may be moved in or out of cylinder 2 for adjustment of tension and position of wires 5 and 6 by means of adjusting nut 8. Tension is maintained by means of spring 11 which pushes an enlarged end 10 of support 9 on one side and plug 4 on the other side. The enlarged end 10 presses against some device to be operated due to the presence of gas such as actuator 13 of the microswitch 12 which operates due to a very small motion of actuator 13. Switch 12 may be normally open or closed as desired. Air which carries the gas to be detected is conducted into inner cylinder 2 through intake tube 24, along wires 5 and 6 and out through exhaust tube 23. A transformer 17—18 with primary 18 connected to a source of alternating current such as the usual 110 volt, 60 cycle supply has its secondary 17 connected across wires 5 and 6 to heat them to a desired initial temperature. Transformer 17—18 may be a constant output regulating transformer for greater stability. In order to operate some external device such as an alarm, motor, or indicating device, the 110 volt, 60 cycle or other power source is connected thru microswitch 12. For purposes of illustration, the microswitch is shown connected to a bell 16. In series with the heating circuit an auxiliary alarm or indicating device may be connected such as bell 22 actuated by battery 21 thru relay 20. Relay 20 is kept open by the heating current which passes thru relay coil 19. Upon failure of the voltage source or the secondary circuit relay 20 closes actuating the alarm 22.

Figure 2:
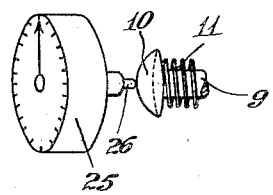
Fig. 2 shows how an indicator may be operated directly by the detector.

Fig. 2 shows how an indicator may be operated directly by the device of Fig. 1. A suitable indicating device such as the dial gage 25, operable by pressure on button 26, may be operated directly by the extension of wires 5 and 6 (Fig. 1). This may be accomplished by positioning gage 25 so that button 10 bears against button 26 as shown.

While not intended to limit the invention, the following constants have been found suitable.

Wires 5 and 6 No. 24 B & S gauge nichrome are treated by wetting with 5% platinic chloride solution dried and heated to leave a residue of finely divided platinum on the surface. The treatment is repeated several times until sufficient platinum is deposited on the wire. Other catalysts such as palladium may also be used. The treated wire may be aged by heating to 800° C. or higher for one-half hour and allowing to cool slowly. The two wires are twisted 8 times per inch.

In place of the two wires shown in the drawing, one or more wires may be used and these wires are not necessarily circular in shape but may be ribbons or any other suitable shape. Since catalysts are well known to those skilled in the art and the catalyst of itself is not part of my invention, I do not wish to limit myself to any one such material, although I have given a specific example above. The catalyst may be applied to the extensible element as described or it may be disposed somewhere within the inner cylinder or may be in the form of pellets or tubes strung upon the wire.

The spring tension is approximately 2.2 pounds under operating conditions.

The atmosphere carrying the gas to be detected is drawn over the wire at the rate of approximately 200 to 300 cubic inches per minute. Contraction due to gas free atmosphere is approximately 0.005 inch. Voltage across wire is 2.25 volts when 3.75 amperes flow thru the wire. The wire temperature is initially raised to approximately 300° C. If contacts of the switch are set to operate with a 0.0025 inch stretch of the wire, the device operates in the presence of about 0.25% of illuminating gas by volume.

It has been found that a greater stretch of the wire is produced by a given calorific value of gas present in the detector than the same calorific value of electric current passed through the wire.

It will be seen that the main alarm or indicating circuit is closed by the presence of gas in the air supply. Breakage of the wire will also close the main alarm or indicator circuit. Failure of the main current source or the transformer closes the auxiliary alarm circuit.

While only one embodiment and one modification of the present invention has been shown and described, many modifications will be evident to those skilled in the art within the spirit and scope of the invention as set forth in the appended claims.

What is claimed is:

1. A gas detector, including the combination of, an elongated enclosure for confining an atmosphere to be tested, a metal fitting at each end of said enclosure for holding a wire-like detector element along the interior of said enclosure, one of said fittings being movably mounted, a detector element comprising a plurality of low-creep wires substantially continuously covered with catalyst material stretched between said fittings, means for passing a pre-heating electric current thru said wires, and resilient means for urging said movable fitting outwardly to operate an external device in response to the elongation of said wires in the presence of a gas to be detected in contact with said catalyst.

2. A gas detector, including the combination of, a tubular enclosure having an opening near each end for passing atmosphere to be tested therethru, a metal fitting at each end of said enclosure, one of said fittings being movably mounted, at least one catalyst covered nichrome wire stretched between said fittings and lying substantially along the axis of said enclosure, means for passing a pre-heating electric current thru said wire, and a resilient device for urging said movable fitting outwardly to operate an external device in response to the elongation of said wire in the presence of gas to be detected in contact with said catalyst.

3. A gas detector, including the combination of, an elongated enclosure with an opening near each end for passing atmosphere to be tested into and out of said enclosure, a metal fitting at each end of said enclosure for holding a wire-like detector element along the interior of said enclosure, one of said fittings being movably mounted, a detector element comprising at least one low-creep wire covered with catalyst material and free along its length stretched between said fittings, an electrical circuit including a voltage source connected externally to said fittings for passing a predetermined pre-heating current thru said element, and spring means for urging said movable fitting outwardly to operate an external device in response to the elongation of said element due to the presence of a gas to be detected in contact with said catalyst.

PAUL TALMEY.